United States Patent [19]

Hackstein et al.

[11] 4,426,338

[45] Jan. 17, 1984

[54] PROCESS FOR THE PRODUCTION OF $U_3O_8$ SINTERED BODIES

[75] Inventors: Karl-Gerhard Hackstein, Hanau; Milan Hrovat, Rodenbach; Hans Huschka; Karl-Heinz Koch, both of Hanau, all of Fed. Rep. of Germany

[73] Assignee: Nukem GmbH, Hanau, Fed. Rep. of Germany

[21] Appl. No.: 274,793

[22] Filed: Jun. 18, 1981

[30] Foreign Application Priority Data

Jun. 30, 1980 [DE] Fed. Rep. of Germany ....... 3024634

[51] Int. Cl.³ .............................................. G21C 21/00
[52] U.S. Cl. ...................... 264/0.5; 241/13; 376/411; 376/432; 423/260
[58] Field of Search ...................... 264/0.5; 241/13; 423/260; 376/411, 432

[56] References Cited

U.S. PATENT DOCUMENTS

| | | | |
|---|---|---|---|
| 3,872,022 | 3/1975 | Hollander et al. | 264/0.5 |
| 4,052,330 | 10/1977 | Jensen et al. | 264/0.5 |
| 4,201,738 | 5/1980 | Johnson | 264/0.5 |
| 4,297,305 | 10/1981 | Lee et al. | 264/0.5 |

*Primary Examiner*—Leland A. Sebastian
*Attorney, Agent, or Firm*—Cushman, Darby & Cushman

[57] ABSTRACT

For the production of plate shaped fuel elements for material testing and research reactors with highly enriched uranium recently there has been needed $U_3O_8$ fuels which have a high density, high strength and a small open porosity. Such fuels are obtained if $U_3O_8$ powder produced in known manner is first compressed mechanically to molded bodies of any shape, then processed to a granulate having a size of fuel grains below 200µ and subsequently sintered to high density particles, preferably at 1370°±50° C.

14 Claims, No Drawings

PROCESS FOR THE PRODUCTION OF $U_3O_8$ SINTERED BODIES

BACKGROUND OF THE INVENTION

The invention is directed to a process for the production of high density $U_3O_8$ sintered fuel grains of fixed granulation as fuel for the manufacture of plate shaped fuel elements for material testing and research reactors from fine grained and still sinterable $U_3O_8$ powder produced according to known processes. The true fuel plates in this case contains the $U_3O_8$ fuel bound in an aluminum matrix.

The fuel element of the classical material test-reactor (MTR) type is constructed of level or bent fuel plates. Each individual plate represents a stratified body whereby the true fuel is encased with material retaining aluminum cladding on all sides.

The fuel plates generally have a thickness of 1.27 mm and a width of about 72 mm. The true fuel zone—the "meat"—thereby has a thickness of 0.51 mm and a width of about 63 mm; the active length is, e.g. 600 mm.

The MTR elements of this construction are distinguished by a desired large heat transferring surface.

The production of fuel plates normally takes place by plating rolls according to the so-called "picture frame technique". As fuel there has previously proven good in industrial use aluminum-uranium-alloys and uranium compounds dispersed in aluminum matrix.

Hereby preferably uranium aluminize and uranium oxide in the form of $U_3O_8$ are used as uranium compounds. The latter fuels are distinguished by being able to be inserted successfully in reactors of high power density (2000 kw/l, e.g. HFIR-Oak Ridge, USA) up to high burn-up because of their high loading capacity. In using $U_3O_8$ and uranium aluminide there were produced in the maximum output of the reactor core burn up of $2 \times 10^{21}$ fissions/cm$^3$ meat, which corresponds at highly enriched uranium (93% U235) to about 70% burn-up (IAEA-Guidebook, December 1979, ORNL-4856).

The use of uranium with high enrichment of the isotope $U^{235}$ as fuel therefore has not ultimately proven good for MTR fuel elements because in so doing the necessarily high nuclear fuel inventory can be produced at relatively low fuel density in a simple manner. On the other hand uranium of high $U^{235}$ enrichment represents sensitive materials whose propagation should be well controlled and should be limited. Because of the proliferation therefore there exists the demand to be able to also add uranium of low $U^{235}$ entrichment (maximal 20 weight %) for the MTR reactors. The conversion of the MTR reactors to low $U^{235}$ enrichment depends on the nuclear fuel inventory being increased for compensation of the increased neutron loss through the higher $U^{235}$ content. This and the insertion of uranium of low enrichment requires substantially higher fuel density at unchanged plate geometry. For this $U_3O_8$ with its relatively high uranium density of 7.1 g U/cm$^3$ from the fuel supplied for the MTR reactors is especially well suited because of its sufficiently good compatibility with aluminum.

In order to produce the relatively high uranium densities in meat of more than 2.6 g U/cm$^3$ high requirements are placed on the granulation of the fuel.

The fuel particles must have a high strength in order to form no segragates in rolling the plates, The open porosity of the granules must be as low as possible in order that the gaseous fission products be retained in the fuel itself and that no inadmissibly high compression stress of the plate occurs. Besides there is required a good embedding of the fuel granules in the aluminum matrix. This assumes that the fuel particles are present in specific, narrowly tolerated particle sizes.

With the previously known process for the production of $U_3O_8$ fuel powder for MTR reactors the mentioned requirement are not guaranteed in sufficient measure. The fuel granules produced according to the previous process are constructed of individually agglomerated particles in their macro-structure. The thus structured fuel particles are destroyed in the rolling step and there is formed undesired segragatt which leads to inhomogeneous fuel distribution. Besides the material retaining embedding of the fuel in the matrix is not guaranteed and therewith the mechanical integrity of the fuel plate is not guaranteed.

Therefore it was the problem of the present invention to develop a process for the production of high density $U_3O_8$ sintered fuel grains of fixed granulation as fuel for the manufacture of plate shaped fuel elements for material test and research reactors from fine grained and still sinterable $U_3O_8$ pwoder produced according to known processes, which leads to a fuel of high density, high strength, and low open porosity with high ability for retaining the fission gases formed in the radiation and which is suited for the further processing by plating rolls.

SUMMARY OF THE INVENTION

The problem was solved according to the invention by first compressing the $U_3O_8$ powder mechanically to molded bodies of any configuration, then processing to a granulate having a grain size below 200$\mu$ and subsequently sintering to high density particles. These particles have a high strength and a low open porosity.

Preferably the sintering of the granulate takes place in air at a temperature below 1500° C., especially at a temperature of 1370°±50° C. The oversize particles arising in the comminution of the mechanically compressed molded bodies advantageously are comminuted again. The sintering process is preferably so conducted by selection of the temperature and duration of the sintering that the density of the $U_3O_8$ sintered particles arising is more than 7.98 g/cm$^3$, which is 95% of the theoretical density. Especially the density of the $U_3O_8$ particles should be 8.32±0.04 g/cm$^3$. Especially good results are obtained if the sintering process is carried out in such manner that the ratio of BET surface area to geometric surface area of the $U_3O_8$ sintered bodies is less than 10:1.

Fuel plates having relatively high uranium density in the meat can be produced by plate rolling according to known processes from $U_3O_8$ sintered bodies produced according to the present invention. The plates produced are distinguished by good homogenity of the distribution of the uranium, good embedding of the individual fuel particles in the aluminum matrix without forming segrates and of high mechanical integrity.

The uranium distribution in the rolled fuel plates with the relatively high uranium density of 3.2 g U/cm$^3$ in the meat measured by $\gamma$ absorption is within a tolerance of ±7%, based on the theoretical value. Metallographic investigation permits detection of the uniform embedding of the fuel particles in the aluminum matrix. The thus produced fuel elements hown a very high ability to retain the fission gases formed in the radiation.

Unless otherwise indicated all parts and percentages are by weight.

The process can comprise, consist essentialy of, or consist of the steps recited with the materials set forth.

The process of the invention will be explained in more detail in the following example:

DETAILED DESCRIPTION

As starting material there is available $U_3O_8$ powder obtained from uranium peroxide by calcining at 600° C. This powder is pressed on a mechanical powder press to cylindrical tablets having the dimensions $9 \times 10$ mm$^2$ with a slug (green) density of 5.5 g/cm$^3$ at a specific molding pressure of 700 MN/m$^2$. The green compact is then ground in a cores beater mill and the granulate with a particle size between 63 and 125$\mu$ sieved out. The oversize granules accumulated are returned to the mill and then ground again. The sieving out of the undersize particles is not absolutely necessary, but it has frequently proven favorable to use only fractions in the size range of 40 to 200$\mu$.

The granulates sieved out (particles 63–125$\mu$) are sintered in a silicon carbide rod furnace in air. The sintering takes place in two steps, namely 4 hours at 1350° C., followed by 2 hours at 1410° C.

The sintered powder was sieved and the particles $90 < \mu$ used for the further processing. The yield was about 90%.

The toluene density of the powder was determined pycometrically and was 8.38 g/cm$^3$. The BET surface area was determined to be 0.09 m$^2$/g. The fine portion of the powder (particles $<40\mu$ was less than 5 weight %.

69.35 grams of $U_3O_8$ fuel powder were pressed dry with 21.67 grams of aluminum powder of the quality Al 99.5 to small shapes of fuels measuring $100.2 \times 61.35 \times 3.0$ (mm).

These small shape fuels were then rolled according to customary process (picture frame art) to fuel plates with a total thickness of 1.27 mm and 0.51 mm meat diameter. The uranium content was relatively high in the meat with a density of 3.2 g/cm$^3$. The fuel plates comply with the high requirement of the MTR specification. The homogenity of the uranium distribution measured according to the $\gamma$ abosrption method was within $\pm 7\%$ of the theoretical value. At a nominal cladding thickness of 0.38 mm the minimal cladding thickness was more than 0.3 mm. The rolling effect of the so-called "dogboning" was practically negligible. In the metallographic photomicrographics a good uniform embedding of the fuel particles in the aluminum matrix was detected.

What is claimed is:

1. A process for the production of high density $U_3O_8$ sintered bodies of specific grain size suitable as fuel for the manufacture of plate shaped fuel elements for material test and research reactors comprising first mechanically compressing fine particle of still sinterable $U_3O_8$ powder to molded bodies, then grinding to form granulates having a particle size below 200$\mu$ and then sintering in air a temperature below 1500° C. to high density particles.

2. A process according to claim 1 wherein the maximum sintering temperature is 1370° C.$\pm$50° C.

3. A process according to claim 1 wherein there are present oversize particles having a particle size above 200 microns, said process comprising again grinding the oversize particles.

4. A process according to claim 1 comprising sintering process to form sintered $U_3O_8$ particles having a density greater than 7.98 g/cm$^3$.

5. A process according to claim 2 comprising sintering process to form sintered $U_3O_8$ particles having a density greater than 7.98 g/cm$^3$.

6. A process according to claim 5 wherein the density of the $U_3O_8$ particles is 8.32 g/cm$^3$$\pm$0.04 g/cm$^3$.

7. A process according to claim 4 wherein the density of the $U_3O_8$ particles is 8.32 g/cm$^3$$\pm$0.04 g/cm$^3$.

8. A process according to claim 6 comprising sintering to provide a ratio of BET surface area to geometrical surface area of the $U_3O_8$ sintered body is less than 10:1.

9. A process according to claim 6 comprising sintering to provide a ratio of BET surface area to geometrical surface area of the $U_3O_8$ sintered body of less than 10:1.

10. A process according to claim 5 comprising sintering to provide a ratio of BET surface area to geometrical surface area of the $U_3O_8$ sintered body of less than 10:1.

11. A process according to claim 4 comprising sintering to provide a ratio of BET surface area to geometrical surface area of the $U_3O_8$ sintered body of less than 10:1.

12. A process according to claim 2 comprising sintering to provide a ratio of BET surface area to geometrical surface area of the $U_3O_8$ sintered body of less than 10:1.

13. A process according to claim 1 comprising sintering to provide a ratio of BET surface area to geometrical surface area of the $U_3O_8$ sintered body of less than 10:1.

14. A process according to claim 1 wherein the sinterable powder consists essentially of $U_3O_8$.

* * * * *